United States Patent
Jokschas et al.

(10) Patent No.: US 9,839,865 B2
(45) Date of Patent: Dec. 12, 2017

(54) OIL FILTER ELEMENT AND OIL FILTER

(71) Applicant: MANN+HUMMEL GMBH, Ludwigsburg (DE)

(72) Inventors: Guenter Jokschas, Murrhardt (DE); Marco Faisst, Besigheim (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 182 days.

(21) Appl. No.: 14/817,911

(22) Filed: Aug. 4, 2015

(65) Prior Publication Data

US 2016/0038859 A1    Feb. 11, 2016

(30) Foreign Application Priority Data

Aug. 5, 2014 (DE) .......... 10 2014 011 394

(51) Int. Cl.
| | |
|---|---|
| *B01D 35/00* | (2006.01) |
| *B01D 29/15* | (2006.01) |
| *B01D 35/153* | (2006.01) |
| *B01D 35/16* | (2006.01) |

(52) U.S. Cl.
CPC .......... *B01D 29/15* (2013.01); *B01D 35/153* (2013.01); *B01D 35/16* (2013.01); *B01D 2201/291* (2013.01); *B01D 2201/342* (2013.01); *B01D 2201/4084* (2013.01)

(58) Field of Classification Search
CPC ...... B01D 29/15; B01D 35/16; B01D 35/153; B01D 2201/342; B01D 2201/4084; B01D 2201/291; B01D 35/005
USPC ....................... 210/493.2, 450, 248
See application file for complete search history.

(56) References Cited

U.S. PATENT DOCUMENTS

| | | | |
|---|---|---|---|
| 5,741,421 A * | 4/1998 | Erdmannsdoerfer | B01D 29/111 210/450 |
| 2002/0036165 A1* | 3/2002 | Sommer | B01D 46/2414 210/438 |
| 2003/0146149 A1 | 8/2003 | Binder et al. | |
| 2008/0035537 A1* | 2/2008 | Klein | B01D 27/148 210/94 |
| 2014/0008282 A1 | 1/2014 | Okai | |

FOREIGN PATENT DOCUMENTS

| | | | |
|---|---|---|---|
| EP | 1031367 A1 | 8/2000 | |
| EP | 1254692 B1 | 4/2004 | |

* cited by examiner

*Primary Examiner* — Madeline Gonzalez
(74) *Attorney, Agent, or Firm* — James Hasselbeck

(57) ABSTRACT

An oil filter element has first and second end disks between which an annular filter medium is held. The oil to be filtered flows through the filter medium in a direction radial to the longitudinal axis of the oil filter element. The oil filter element has a central channel arranged on the clean side and provided with a central outlet opening in the region of the first end disk. A radial sealing element, formed by an elastically deformable inside circumferential section of the first end disk, is arranged in the region of the outlet opening. In addition, an axial sealing element is arranged on the outside of the first end disk. This axial sealing element is held on the first end disk by retaining elements. An oil filter having such an oil filter element is provided.

11 Claims, 3 Drawing Sheets

OIL FILTER ELEMENT AND OIL FILTER

BACKGROUND OF THE INVENTION

The invention relates to an oil filter and an oil filter element comprising a first end disk and a second end disk and an annularly arranged filter medium that is secured between the two end disks so that the oil to be filtered can flow through it in a direction radial to the longitudinal axis of the oil filter element. The oil filter element has a central channel, which is downstream fluidically from the filter medium, i.e., is arranged on the clean side of the oil filter element. The central channel has a central outlet opening for the filtered oil at one end in the region of the first end disk. An elastically deformable radial sealing element is arranged in the region of the outlet opening, and an annular axial sealing element is arranged on the outside of the first end disk.

Such oil filter elements are known from EP 1 254 692 B, for example, and are used in oil filters in which the filter housing comprises a container part that can be closed by means of a housing cover. An oil outlet connection, which extends into the outlet opening of the oil filter element and is in sealing contact with the radial sealing element of the oil filter element, is formed on the container part of the filter housing. The container part has an oil drain device with a drain opening, which surrounds the oil outlet connection at least partially and is delimited by a side wall in a direction radial to the longitudinal axis of the oil filter element. When the filter housing is closed, the oil filter element is in sealing contact with the end of side wall of the drain opening to seal the oil drain device with respect to a crude fluid side of the filter housing upstream fluidically of the oil filter element. To replace the oil filter element, the oil in the filter housing must first be drained out of the filter housing. This is done by lifting the oil filter element up from the container part. Then the axial sealing element is removed from its sealing contact with the side wall and a fluidic connection is established between the crude fluid side and the oil drain device. The oil on the crude fluid side then flows out through the drain device by gravity and downward out of the filter housing.

EP 2 578 821 A1 discloses an oil filter in which the oil filter element is detachably coupled to the housing cover. The oil filter element can therefore be removed directly from its sealing position from the side wall of the drain opening and/or the drain channel by lifting the housing cover up from the container part and, when lifted further, the radial sealing element can also be removed from its sealing contact with the outlet connection of the filter housing.

In the prior art, the employed radial and axial sealing elements are designed in one piece with one another, i.e., formed by a single ring gasket, and are expensive to manufacture, not least of all because of their complex three-dimensional design.

The object of the invention is to provide an oil filter element and an oil filter with radial and axial sealing elements, as mentioned in the introduction, which can be manufactured more easily and less expensively while retaining functionality.

SUMMARY OF THE INVENTION

The object relating to the oil filter element is achieved by an oil filter element that comprises a first end disk and a second end disk; an annular filter medium, which is held between the two end disks and through which oil to be filtered can flow from the outside to the inside in a direction radial to the longitudinal axis of the oil filter element; a central channel arranged fluidically downstream of the filter medium and having an outlet opening in the region of the first end disk; an elastically deformable radial sealing element, which is arranged in the region of the outlet opening; and an elastically deformable axial sealing element arranged on the outside of the first end disk, wherein the radial sealing element is formed by an elastically deformable inside circumferential section of the first end disk and wherein the axial sealing element is held by means of retaining elements on the outside of the first end disk.

The oil filter according to the invention, in particular for motor vehicles, comprises a filter housing with a container part, which can be closed by means of a housing cover; an oil filter element as defined above inserted into the filter housing; an oil outlet connection, which is designed on the container part and is inserted into the outlet opening of the oil filter element and on which the radial sealing element of the oil filter element is in sealing contact in the closed state of the filter housing; a drain opening for oil designed on the container part and extending around at least a portion of the circumference of the oil outlet connection and bordered by a side wall in a direction radial to the longitudinal axis of the oil filter element; wherein the oil filter element is in sealing contact with the axial sealing element on the end of the side wall in the closed state of the filter housing in order to seal the crude side of the oil filter with respect to the drain opening, the crude side being fluidically upstream of the oil filter element.

Advantageous embodiments of the invention are derived from the description and are the subject matter of the dependent claims.

The oil filter element according to the invention is characterized by a simplified production overall, which is also less expensive. Due to the fact that the radial sealing element is formed directly in the region of the outlet opening of the central channel by the inside circumferential section of the end disk, a radial sealing element that is to be manufactured separately is not needed. This eliminates the manufacturing step that would be necessary for assembly of such an additional element. In comparison with the prior art, the axial sealing element can be manufactured less expensively and installed more easily. Such axial sealing elements are also freely available on the market in prefabricated form in suitable dimensions and designs.

According to a particularly preferred embodiment of the invention, the radial sealing element may be formed from an elastic material, in particular based on nitrile rubber and a phenolic resin. From the standpoint of manufacturing technology, it has proven advantageous for the first end disk to be constructed in multiple layers. In this case, the radial sealing element is formed by a first layer of the end disk. In other words, the first layer of the end disk is made of an elastically shapeable material, preferably based on nitrile rubber and a phenolic resin. In the manufacture of the oil filter element, the starting material for the first layer of the end disk, usually in the form of a film, is heated and therefore softens and liquefies to such an extent that the filter medium can be embedded with a free edge section in the first layer of the end disk. By heating, the nitrile rubber and the phenolic resin are moreover stabilized by crosslinking of the polymer chains to such an extent that the first layer can absorb sufficiently high compressive and/or tensile forces, on the one hand, while, on the other hand, after being cooled, the first layer also offers the desired residual elasticity for the required sealing capacity of its internal circumferential section that functions as a radial sealing element.

It is difficult or even impossible to form integrally molded components on the first layer, which is made of phenolic resin and rubber. Therefore, in the case of the end disk having a multilayer structure, a second layer preferably forms an exterior side of the first end disk facing away from the filter medium. The retaining elements for the axial sealing element can be attached to this layer according to the invention, in particular can be integrally molded thereon. To this extent, the second layer of the end disk may be manufactured from an inexpensive plastic, such as a thermoplastic.

A third layer, which serves to provide an adhesive bond between the first layer and the second layer, may advantageously be arranged between the first layer and the second layer of the first end disk. Like the second layer, the third layer may be made of a thermoplastic material, which is liquefied by heating during the manufacturing process of the oil filter element in order to bond the first layer to the second layer. The layers of the first end disk can also be welded to one another. The third layer may advantageously be formed from a fiber material, in particular polyester fibers. The material of the third layer preferably has a lower melting point than the material of the second layer of the first end disk.

The oil filter according to the invention is suitable in particular for use in motor vehicles and is provided in its interior with the oil filter element described above.

The oil filter can be manufactured particularly inexpensively and highly user-friendly.

Due to the fact that the oil filter element arranged in the oil filter housing fulfills the sealing function of the crude side of the oil filter with respect to the drain channel and/or the drain opening, as well as the central channel of the oil filter element, which is arranged on the clean side, the oil, which is on the crude side or the clean side of the oil filter, can be drained out of the oil filter in a controlled manner before replacing the oil filter element when the oil filter element is removed from the container part of the filter housing. The oil filter element may advantageously be releasably attached to the housing cover of the oil filter. The oil filter element can therefore be removed from the container part in a simplified procedure by lifting the housing cover of the container part of the filter housing in the axial direction and removing it.

According to the invention, contamination of the clean side of the oil filter housing with unfiltered oil present on the crude side can be prevented by the fact that the oil outlet connection extends axially from the container part further in the direction of the housing cover than does the side wall of the container part bordering the drain opening. Therefore, draining of the (unfiltered) oil out of the crude side of the filter housing and of the (filtered) oil out of the clean side is made possible.

It is self-evident that the oil filter element according to the invention may also be designed as a fuel filter element. The oil filter may be designed as a fuel filter in a corresponding manner.

BRIEF DESCRIPTION OF THE DRAWINGS

The invention will now be explained in greater detail below on the basis of an exemplary embodiment depicted in the drawings.

DESCRIPTION OF PREFERRED EMBODIMENTS

Figure 1:
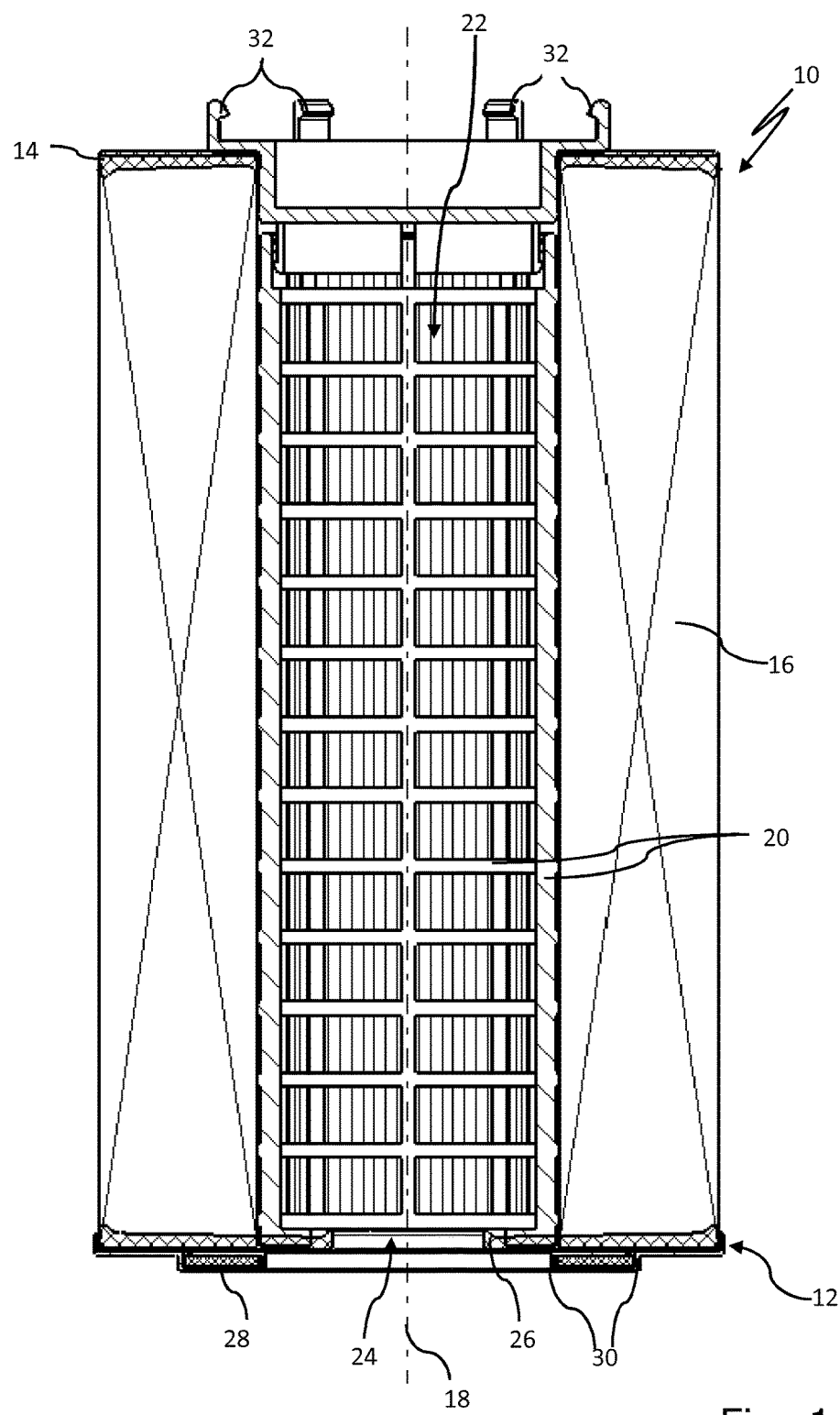
FIG. 1 show in longitudinal section view an oil filter element comprising two end disks between which an annular filter element is secured and further comprising a central channel which has an outlet opening in the region of one of the two end disks, wherein the outlet opening is provided with a radial sealing element formed only by the elastically deformable material of one end disk and having an axial sealing element held on the outside on the end disk.

FIG. 1 shows an oil filter element 10 in a longitudinal section view. The oil filter element 10 has a first end disk 12 and a second end disk 14 as well as a filter medium 16 of an annular arrangement, held between the two end disks 12, 14. The oil to be filtered flows through the filter medium 16 from the outside to the inside in a direction that is radial to the longitudinal axis 18 of the oil filter element 10.

The filter medium 16 is supported on the inside by a central tube 20. The central tube 20 is designed like a mesh and, as shown in FIG. 1, can be locked with the second end disk 14 or otherwise attached to the second end disk 14 and/or integrally molded on the second end disk 14. The central tube 20 delimits on the inside a central channel 22 into which the oil flows as it passes through the filter medium 16, i.e., is filtered. The central channel 22 extends between the two end disks 12, 14 in a direction that is axial to the longitudinal axis 18 of the oil filter element 10. The central channel 22 may be arranged so that it runs coaxially with the longitudinal axis 18, as shown in FIG. 1. The central channel 22 is closed at one end by the second end disk 14 and at the other end has an outlet opening 24 for conveying the filtered oil out of the oil filter element 10. The outlet opening 24 is provided with an elastically deformable radial sealing element 26, which is explained in greater detail below in conjunction with FIG. 2.

An annular axial sealing element 28 is arranged on the outside of the first end disk 12, i.e., on its side facing away from the second end disk 14. The axial sealing element 28 is made of an elastomer and may have a rectangular cross section in particular. For fastening the axial sealing element 28, two annular retaining elements 30 are used that extend axially away from the first end disk 12. The two retaining elements 30 are each arranged coaxially with the longitudinal axis 18 and have different diameters. The axial sealing element 28 is held in a groove (not shown in FIG. 1) which is formed between the two retaining elements 30. The axial sealing element 28 and the radial sealing element 26 are arranged so they are offset in relation to one another in the axial direction.

First fastening and/or coupling means 32, integrally molded on the outside of the second end disk 14, serve to provide releasable fastening of the oil filter element 10 on the housing cover of a filter housing. The first fastening and/or coupling means 32 in the present case are designed as locking tongues, but may also be designed as bayonet closure parts, for example. It is self-evident that the housing cover of the filter housing of the oil filter must have two coupling means which are designed to be complementary to the first fastening and/or coupling means 32.

Figure 2:
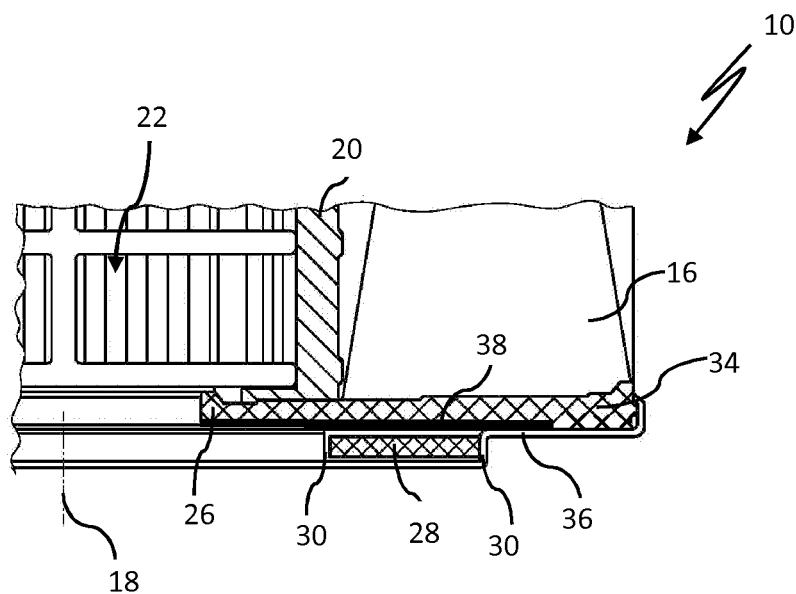
FIG. 2 shows a detail view of the end disk of the oil filter of FIG. 1.

FIG. 2 shows an enlarged detail of an oil filter element of FIG. 1. The first end disk 12 is designed with multiple layers. In the exemplary embodiment shown here, the first end disk 12 has a total of three layers, which differ from one another at least partially in their material. An interior first layer 34 of the first end disk 12 is made of an elastic material, i.e., nitrile rubber and a phenolic resin. This first layer 34 fulfills a double function. On the one hand, the filter medium 16 is embedded in the first layer and/or welded to it and, on the other hand, the first layer 34 forms the radial sealing element 26 with its inside circumferential section.

In the manufacture of the oil filter element 10, the (starting) material, usually in the form of a film, of the first layer 34 of the first end disk 12 is heated and thereby softened and/or liquefied to such an extent that the filter medium 16 can be embedded with a free edge section in the first layer 34 of the first end disk 12. By heating, the nitrile rubber and the phenolic resin are moreover stabilized by crosslinking of polymer chains to such an extent that, on the one hand, the first layer 34 can absorb compressive forces and/or tensile forces. After cooling, the first layer also offers the desired residual elasticity for the required sealing capacity of its internal circumferential section, which functions as a radial sealing element 26. This process is also known as curing in polymer chemistry.

As indicated in FIG. 2, the first end disk 12 has a second layer 36 on the outside, which may consist of a plastic material, for example, in particular a thermoplastic material. The retaining elements 30 of the first end disk 12 are integrally molded onto this second layer 36.

A third layer 38 is arranged between the first and second layers. The third layer 38 may be formed by a polyester nonwoven, for example, or some other mesh or textile structure made of polyester. The third layer 38 serves to form an adhesive bond between the first and second layers 34, 36 of the first end disk 12. The three layers 34, 36, 38 of the first end disk 12 may be bonded to one another and/or welded to one another.

Figure 3:
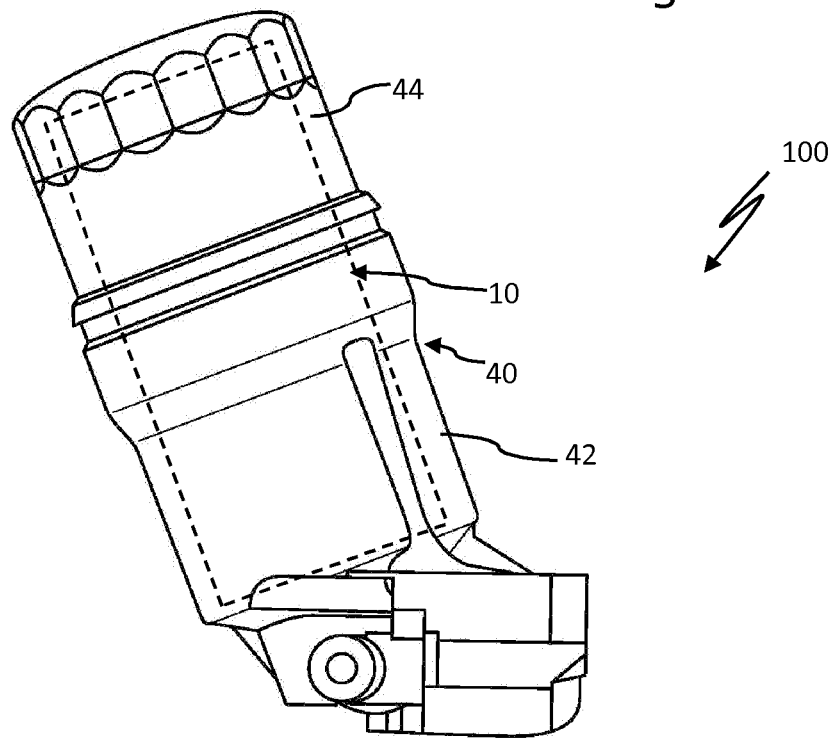
FIG. 3 shows an oil filter with a filter housing and an oil filter element according to FIG. 1 inserted therein in a side view.

FIG. 3 shows an oil filter 100 of the kind used in particular in motor vehicles for filtering oil or other lubricants. The oil filter 100 comprises a filter housing 40 with a container part 42 that can be closed by means of a housing cover 44. The oil filter element 10 shown in FIGS. 1 and 2 is arranged in the filter housing 40. The oil filter element 10 is shown in broken lines in FIG. 3. The first coupling elements (FIG. 1) of the filter element 10 engage the second coupling elements (not shown in greater detail here) of the housing cover 44. The oil filter element 10 is therefore releasably attached to the housing cover 44 and its position is secured axially thereon.

Figure 4:
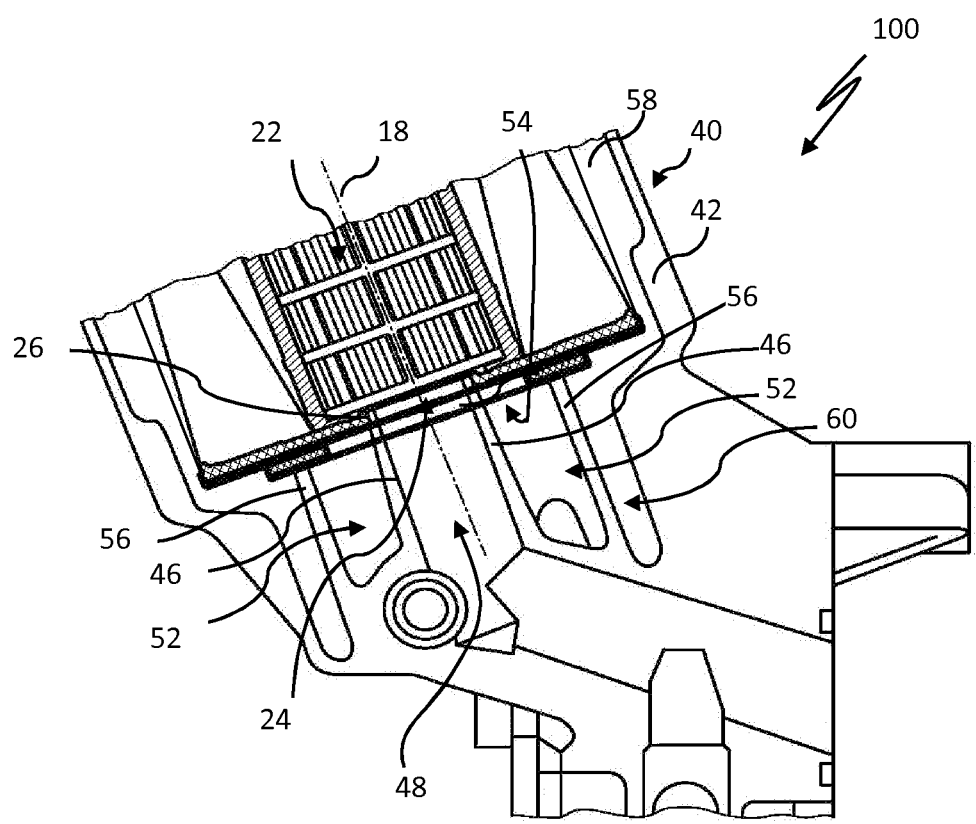
FIG. 4 shows a detail view of the oil filter of FIG. 3.

FIG. 4 shows the oil filter 100 of FIG. 3 in a sectioned detail view. The container part 42 has an oil outlet connection 46 fluidically connected to an oil outlet channel 48 of the filter housing 40. During operation of the oil filter 100, the oil filtered in the oil filter element 10 flows out of the oil filter 100 through the oil outlet channel 48. The oil outlet connection 46 extends into the outlet opening 24 of the oil filter element 10 and is in sealing contact with the elastically deformable inside circumferential section of the first end disk 12 of the oil filter element 10, i.e., in a radial direction on the radial sealing element 26.

The oil filter 100 has an oil drain device, by means of which oil present in the oil filter 100 can be drained out of the filter housing 40. Replacement of the oil filter element 10 is therefore simplified. The oil drain device has a drain channel 52 with a drain opening 54 designed in the form of a ring. The drain opening 54 extends around at least a portion of the circumference of the oil outlet connection 46 of the container part 42. The drain opening 54 is bordered by a side wall 56 in a direction radial to the longitudinal axis 18 of the oil filter element 10. In a direction axial to the longitudinal axis 18 of the oil filter element 10, the oil outlet connection 46 extends farther in the direction of the housing cover 44 (FIG. 3) than the side wall 56 of the drain channel 52. In the closed state of the filter housing 4, the axial sealing element 28 provided on the oil filter element 10 is in sealing contact with the axial end of the side wall 56.

Due to the axial sealing element 28 of the oil filter element 10, a crude side 58 of the oil filter 100, which is fluidically upstream of the filter medium 16 of the oil filter element 10, is sealed with respect to the drain channel 52. The central channel 22 of the oil filter element 10 arranged on the clean side is sealed by the radial sealing element 26 with respect to the drain channel 52. Due to the fact that the oil filter element 10 is releasably coupled to the housing cover (FIG. 3), the oil filter element 10 is moved away from the container part 42 of the filter housing when the housing cover 44 is lifted up from the container part 42 in the axial direction. As soon as the axial sealing element 28 has moved out of its sealing position on the side wall 56 of the drain channel 52, the (unfiltered) oil present on the crude side 58 of the oil filter 100 drains out of the filter housing 40 through the drain channel 52 by gravity. During operational use of the oil filter 100, for example, in conjunction with an internal combustion engine, the (filtered) oil present on the clean side of the oil filter 100 usually drains from the filter housing 40 through the oil outlet channel 48 by gravity when the engine is shut down. When the housing cover is lifted farther away from the container part 42, the radial sealing element 26 is moved out of its sealing contact with the oil outlet connection 46. Due to this configuration, there is only negligible contamination of the clean side of the oil filter 100 fluidically downstream of the filter medium 16 of the filter element 10 by unfiltered oil present on the crude side when replacing the oil filter element. An oil inlet channel 60 of the oil filter 100 is fluidically connected to the crude side 58 of the oil filter 100.

While specific embodiments of the invention have been shown and described in detail to illustrate the inventive principles, it will be understood that the invention may be embodied otherwise without departing from such principles.

What is claimed is:

1. An oil filter element comprising:
   a first end disk and a second end disk;
   an annular filter medium secured between the first end disk and the second end disk,
   wherein a longitudinal axis of the oil filter element extends through the first end disk, the annular filter medium, and the second end disk,
   wherein oil to be filtered can flow from an outside of the filter medium to an inside of the filter medium in a direction radial to the longitudinal axis;
   a central channel arranged fluidically downstream of the filter medium and comprising
      an outlet opening arranged at the first end disk;
      an elastically deformable radial sealing element arranged at the outlet opening and formed by an elastically deformable inside circumferential section of the first end disk;
   an elastically deformable axial sealing element arranged on an outside of the first end disk;
   the first end disk comprising
      retaining elements arranged on the outside of the first end disk, the retaining elements securing the axial sealing element;
   wherein the first end disk is a multi-layer end disk, comprising:

a first layer forming the radial sealing element;
a second layer arranged on the outside of the first end disk, the outside of the first end disk pointing away from the filter medium;
a third layer, arranged between the first layer and second layer,
wherein the retaining elements are integrally molded with the second layer;
wherein the third layer forms an adhesive bond that bonds the first layer and second layer to each other.

2. The oil filter element according to claim 1, wherein the radial sealing element is comprised of an elastic material comprised of nitrile rubber and a phenolic resin.

3. The oil filter element according to claim 1, wherein the third layer is comprised of a thermoplastic material.

4. The oil filter element according to claim 1, wherein the thermoplastic material is polyester.

5. The oil filter element according to claim 1, wherein the first end disk comprises several layers that are welded to one another.

6. The oil filter element according to claim 1, wherein the first end disk comprises several layers that are bonded and welded to one another.

7. An oil filter element, comprising:
a first end disk and a second end disk;
an annular filter medium secured between the first end disk and the second end disk,
wherein a longitudinal axis of the oil filter element extends through the first end disk, the annular filter medium, and the second end disk,
wherein oil to be filtered can flow from an outside of the filter medium to an inside of the filter medium in a direction radial to the longitudinal axis;
a central channel arranged fluidically downstream of the filter medium and comprising
an outlet opening arranged at the first end disk;
an elastically deformable radial sealing element arranged at the outlet opening and formed by an elastically deformable inside circumferential section of the first end disk;
an elastically deformable axial sealing element arranged on an outside of the first end disk;
the first end disk comprising
retaining elements arranged on the outside of the first end disk, the retaining elements securing the axial sealing element,
wherein the second end disk has fastening means configured to detachably fasten the oil filter element on a housing cover of an oil filter.

8. The oil filter element according to claim 7, wherein the fastening means are configured to lock the oil filter element on the housing cover.

9. An oil filter comprising:
a filter housing comprising a container part and further comprising a housing cover configured to close off the container part;
an oil filter element inserted into the filter housing, the oil filter element comprising:
a first end disk and a second end disk;
an annular filter medium secured between the first end disk and the second end disk,
wherein a longitudinal axis of the oil filter element extends through the first end disk, the annular filter medium, and the second end disk,
wherein oil to be filtered can flow from an outside of the filter medium to an inside of the filter medium in a direction radial to the longitudinal axis;
a central channel arranged fluidically downstream of the filter medium and comprising an outlet opening arranged at the first end disk;
an elastically deformable radial sealing element arranged at the outlet opening and formed by an elastically deformable inside circumferential section of the first end disk;
an elastically deformable axial sealing element arranged on an outside of the first end disk;
the first end disk comprising retaining elements arranged on the outside of the first end disk, the retaining elements securing the axial sealing element;
the container part comprising an oil outlet connection that is inserted into the outlet opening of the oil filter element,
wherein the radial sealing element of the oil filter element is in sealing contact with the oil outlet connection in a closed state of the filter housing,
the container part comprising a drain opening for oil, the drain opening bordered by a side wall of the container part in a direction radial to the longitudinal axis of the oil filter element, the drain opening extending around at least a portion of a circumference of the oil outlet connection;
the axial sealing element of the oil filter element sealing a crude side of the oil filter relative to the drain opening by being in sealing contact with an axial end of the side wall in the closed state of the filter housing, the crude side being fluidically upstream of the oil filter element.

10. The oil filter according to claim 9, wherein
the oil filter element is releasably attached to the housing cover of the filter housing,
wherein by lifting the housing cover away from the container part, the axial sealing element is moved out of the sealing contact with the axial end of the side wall and the radial sealing element is moved out of the sealing contact with the oil outlet connection, respectively.

11. The oil filter according to claim 9, wherein
the oil outlet connection extends axially farther toward the housing cover than the side wall of the container part.

* * * * *